United States Patent [19]
Baden et al.

[11] Patent Number: 5,708,499
[45] Date of Patent: Jan. 13, 1998

[54] OPTICAL COMPONENTS FOR LIVE-FIBER IDENTIFIER AND COUPLER

[75] Inventors: John L. Baden, Dunwoody; Charles H. DuVall, Atlanta; Dean R. Frey, Dunwoody; Stephen C. Mettler, Decatur, all of Ga.

[73] Assignee: Lucent Technologies Inc., Murray Hill, N.J.

[21] Appl. No.: 686,075

[22] Filed: Jul. 24, 1996

[51] Int. Cl.⁶ .................................................. G01N 21/84
[52] U.S. Cl. ................................. 356/73.1; 250/227.16
[58] Field of Search ....................... 356/73.1; 250/227.16

[56] References Cited

U.S. PATENT DOCUMENTS

| | | | |
|---|---|---|---|
| 3,931,518 | 1/1976 | Miller | 250/227 |
| 4,474,423 | 10/1984 | Bisbee et al. | |
| 4,557,550 | 12/1985 | Beals et al. | 250/227.16 X |
| 4,749,248 | 6/1988 | Aberson, Jr. et al. | |
| 4,912,523 | 3/1990 | Refi et al. | 455/607 |
| 5,067,786 | 11/1991 | Hawkins et al. | 356/73.1 X |
| 5,127,724 | 7/1992 | James et al. | 356/73.1 |

FOREIGN PATENT DOCUMENTS 2226128  12/1993  United Kingdom.

*Primary Examiner*—Vincent P. McGraw

[57] ABSTRACT

The present invention is a device which may be used to detect the presence of light in a single mode optical fiber while the optical fiber is in use, or to introduce light into an optical fiber. The device includes an identifier chip, and an associated, complementary shaped plate, each of which employ both microbending and macrobending portions. The chip and the plate are each formed of a single piece of material, although only the chip must be formed of an optically transmissive material. In use the chip is urged toward the plate with an optical fiber therebetween. Deformation of the fiber caused by the stress exerted by the chip and the plate will cause detectable light to be emitted through the chip if the fiber is live.

28 Claims, 3 Drawing Sheets

OPTICAL COMPONENTS FOR LIVE-FIBER IDENTIFIER AND COUPLER

BACKGROUND OF THE INVENTION

The present invention relates to fiber optic communications systems. In particular, the invention relates to a device which can be used to detect whether traffic or a test signal is present on a single-mode fiber optic core. Alternatively, the device can be used to couple light into an optical fiber.

The widespread use of optical fiber for telecommunications has led to the need for a device which is able to quickly test whether a particular fiber is in use (i.e., whether or not it is carrying traffic which will be referred to herein as "live"). It is desirable to perform these operations without breaking or terminating the fiber in order to gain direct access to the fiber optic core. Such determination is useful in situations in which a fiber optic ribbon, comprised of several optical fibers, or a fiber optic cable, comprised of several fibers or ribbons is broken, and not all of the fibers are broken.

In such cases, it is necessary to replace or splice only those fibers which have been broken, and it is desirable to avoid removing from service, or damaging, the remaining, unbroken, fibers. In order to determine whether a particular fiber has been broken, a device which can test a live fiber is desired. Such devices are called "identifiers", or "live fiber identifiers".

Due to the benefits of single mode optical fiber, as compared to multimode optical fiber, the use of single mode fiber is far more prevalent today than multimode fiber. A particular benefit of single mode fiber, as compared to multimode fiber, is that it is able to carry data at extremely high rates over much longer distances without the need for a repeater. This presents problems with single mode fiber in that it is more difficult to test than multimode fiber without removing it from service. Yet, there is a very high cost associated with the removal of single mode fiber from service, due to the high traffic volume which a live fiber typically carries.

In the past, so-called macrobend devices were available for testing single mode fibers, as they could detect whether traffic or a test signal was present on the single mode fiber optic core being tested. As used herein, the term "macrobend" means that the amount of bend to which the fiber is subjected is large relative to the physical diameter of the fiber, and the term "macrobend device" means a device which imposes a bend on the fiber which is large relative to the physical dimensions of the fiber. Accordingly, the term "macrobend device" is used herein to mean a device which imposes a large physical distortion on the fiber, so any device which causes the fiber to bend to conform to the shape of the bending device is specifically a macrobend device as that term is used herein. In particular, a macrobend device will typically have two portions, which do not conformably fit together, as they allow space for a conformal fiber to fit between them. By way of example, if one portion (i.e., the "blade") of a device is formed with a convex radius of 4.00 mm, and the corresponding portion of the complementary device (i.e., the "chip") is formed with a concave radius of 4.25 mm, then the device is a macrobend device, as that term is used herein, as the two portions of the device are not conformal, but a fiber may be bent conformably therebetween.

A macrobend device works by bending the fiber conformably around a mandrel, and detecting any light which escapes at the bend. A problem with such devices is that they are most effective when the diameter of the mandrel is small, but that is also when they subject the fiber to a great deal of stress, which means that the likelihood of damage to the fiber is the greatest.

The problem with macrobend devices is that if enough pressure is employed to bend the fiber sufficiently to test for the presence of either 1.31 μm or 1.55 μm light, there is a greater probability that the fiber will be damaged than if the fiber is only stressed sufficiently to test for the presence of 1.55 μm light. As single mode fibers may carry light of both wavelengths simultaneously, it is desirable to have a single identifier which can simultaneously test for light of either wavelength in order to increase the likelihood of properly identifying a live, unbroken fiber.

Another type of device which has been used heretofore, typically in connection with the testing of multimode fibers, rather than single mode fibers, is a so-called microbend device. As used herein, the term "microbend" means that the amount of bend to which the fiber is subjected is small relative to the physical diameter of the fiber, and the term "microbend device" means a device which imposes a bend on the fiber which is small relative to the physical dimensions of the fiber. Accordingly, the term "microbend device" is used to mean a device which imposes a small physical distortion on the fiber, so any device which causes the fiber to bend to conform to the shape of the bending device is specifically not a microbend device as that term is used herein. In particular, a microbend device will typically have two portions, which conformably fit together, as they do not need space therebetween for a fiber to conformably fit between them, as they are merely intended to put pressure on either side of the fiber in order to accomplish a microbend of the fiber, rather than a conformal fit.

Microbend devices are able to identify whether there is light passing through a multimode fiber by imposing a small periodic disturbance along the longitudinal axis of the multimode fiber to distort the core of the fiber periodically by a very small amount. If the period of the microbends matches the difference in the propagation constants of any two modes carried by the fiber, a coupling of light between the two modes is forced, resulting in a measurable light output. For a discussion of microbend devices, reference is made to U.S. Pat. No. 3,931,518 entitled OPTICAL FIBER POWER TAPS EMPLOYING MODE COUPLING MEANS which issued on Jan. 6, 1976 to Stewart Edward Miller and which was assigned to Bell Telephone Laboratories, Inc., the contents of which are incorporated herein by reference.

Until relatively recently, it was believed that microbend devices had utility only when a multimode fiber was used, as the operation of a microbend device relies upon the coupling of different optical modes, which are not present in a single mode fiber. Accordingly, single mode fibers were generally tested by using only macrobend devices, and, as set forth above, they were most likely to be damaged in tests using the small diameter mandrels, which provided the most sensitivity. However, it was recently discovered that microbends could be used to remove radiation from optical fibers, as discussed in U.S. Pat. No. 4,749,248 entitled DEVICE FOR TAPPING RADIATION FROM, OR INJECTING RADIATION INTO, SINGLE MADE [sic] OPTICAL FIBER POWER, AND COMMUNICATION SYSTEM COMPRISING SAME which issued on Jun. 7, 1988 to James A. Aberson, Jr. and Ian A. White and which was assigned to American Telephone and Telegraph Company, the contents of which are incorporated herein by reference.

As described in the Aberson, et at. patent, it was discovered that single mode fibers actually carry higher order modes in addition to the primary ("single") mode for short distances. Consequently, this means that microbend devices could be used in identifiers for use with single mode fibers. One such identifier is described in U.K. Patent GB 2 226 128 issued to Davis Myers and in an article entitled "A PRACTICAL INSTRUMENT FOR NON-INTRUSIVE DETECTION OF LIGHT ON SINGLEMODE OPTICAL FIBRES" by Max Penfold. While that article described the use of a combination device for testing single mode fibers using both microbending and macrobending, the device described therein is quite complicated, as it includes both a macrobend device and a microbend device, which move relative to one another when the device is used. Consequently, the device makes use of an electric motor driven apparatus to move the head of the device in and out in order to accomplish both macrobending and microbending. A problem with that device is that it includes many elements, i.e., moving microbend heads, an electric motor, and associated control electronics, which increase its cost and complexity. Notwithstanding these extra elements, the device actually sold by BICCOTEST does not display the direction of the traffic or signal.

In view of the above, a simple solution to the problem of detecting whether a signal was present by using a single device which has fewer moving parts, and which does not need either an electric motor or controlling electronics would be desirable.

SUMMARY OF THE INVENTION

The present invention is a live fiber identifier and coupler for use in testing (or coupling signals into) single mode optical fiber. The identifier is made up of a chip portion which is formed of a material which will pass light of the wavelength carried by the fiber. By way of example, the chip portion may be made of a polycarbonate material. The chip portion is formed of a single piece of material which has a surface adapted to receive an optical fiber, and which is shaped to have both a macrobend portion and a microbend portion.

The invention further includes a plate portion, which may be formed of the same material as the chip portion (although it does not have to be transparent), and which has a shape which is complementary to the fiber receiving surface of the chip portion.

While the primary invention resides in the chip portion and the associated plate portion, a tool to utilize them would further include some means for mechanically urging the chip portion toward the plate portion with an optical fiber, believed to be live, therebetween, so that when the plate portion and the chip portion are urged together, they will simultaneously impose both macrobending and microbending forces upon the optical fiber between them.

The invention could further include some means, such as a photodetector, which can sense any light which is emitted from a fiber undergoing a test or a light emitting device (e.g., an LED or a laser) to inject light into a fiber, so that the device can be used as a light coupler.

DETAILED DESCRIPTION OF THE PREFERRED EMBODIMENT OF THE INVENTION

Figure 1:
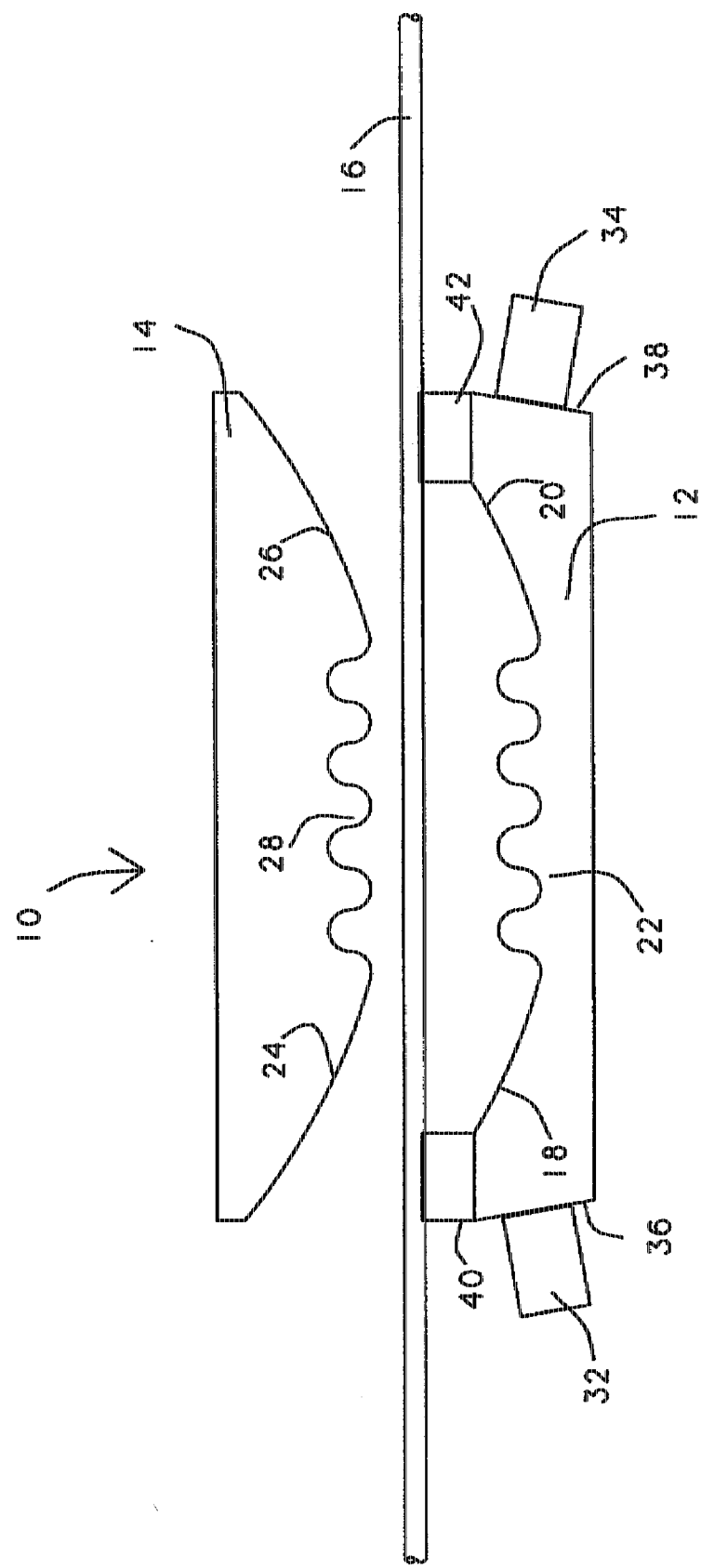
FIG. 1 illustrates the optical components of the identifier of the present invention prior to placing any pressure on the optical fiber to be tested.

Referring to FIG. 1, the optical components of the identifier 10 of the present invention are comprised of two portions, namely an identifier chip 12 and a deflector plate 14. The identifier chip 12, or "chip" 12 is made of an optically transmissive material, such as a polycarbonate. As light does not pass through the plate 14, it is optionally made of either an opaque material or an optically transmissive material, such as a polycarbonate. The chip 12 includes arcuate portions 18 and 20 which, together, comprise a macrobending device. By way of example, the macrobending arcuate portions 18, 20, in the preferred embodiment are formed to have a radius on the order of about 4.25 mm, if the identifier 10 is to be used with a single mode fiber carrying light having a wavelengths of both 1.3 µm and 1.55 µm. However, a radius between about 3 mm and 6 mm could be used for the macrobending portions 18, 20.

Figure 2:
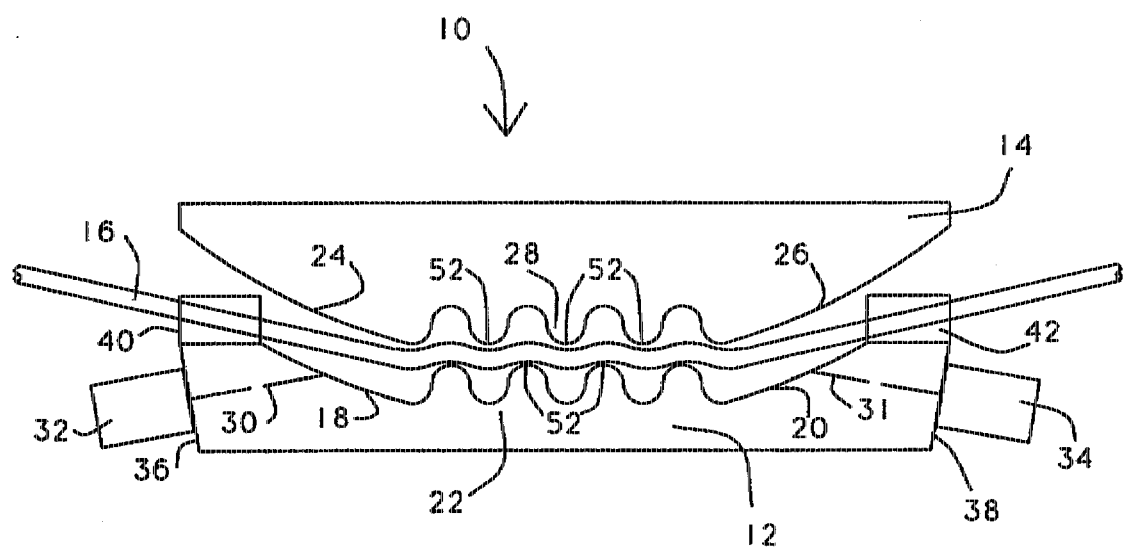
FIG. 2 illustrates the components of the identifier of the present invention as they exert pressure to deform the optical fiber undergoing the test.

The chip 12 further comprises a central portion 22 which is formed to include a periodic microbending portion. As illustrated in FIG. 1, the microbending portion 22 is formed between the two adjacent macrobending portions 18, 20. The microbending portion 22 is preferably formed to have a shape such that when viewed from the side (i.e., as shown in FIGS. 1 and 2), the shape is periodic. By way of example, in the illustrated preferred embodiment of the invention, the microbending portion 22 is in the form of a sine wave having a period of approximately 18 mils (0.018 inches or 0.457 mm), peak to peak, although other values in the range of about 15 to 25 mils could be used. As defined above, the microbending portion 22 is used to deflect the fiber 16 by an amount which is small relative to the diameter of the fiber 16. Accordingly, in the preferred embodiment of the invention 10, the deflection of the fiber 16 may be on the order of about 10 microinches (from a straight line with about one pound of force applied to the fiber 16) in the microbend portion, as illustrated in FIG. 2.

Similar to the chip 12, the plate 14 includes both macrobending portions 24, 26, and a central microbending portion 28. The macrobending portions 24, 26, of the plate have a radius of about 4.00 mm in the preferred embodiment of the invention, i.e., they are not conformal to the complementary portions 18, 20 of the plate 12, although they could have a radius in the range of about 3 mm to about 6 mm. The microbending portions 28 of the plate are constructed to be conformal to the complementary portion 22 of the chip 12. From the foregoing discussion, it should be understood that as used herein, the term "complementary" does not mean "conformal".

In use, the chip 12 and the plate 14 surround an optical fiber 16, and they are pressed together, as shown in FIG. 2, in order to deflect the fiber 16. The combined pressure of the chip 12 and the plate 14 cause the fiber 16 to be physically stressed both by the macrobending portions 18, 20, 24, 26, and by the microbending portions 22, 28, whereby the fiber 16, if live, will transmit light along an optical path, illustrated by dashed lines 30, 31, which are offset (at either end of the chip) by approximately 10° from the horizontal, as shown in FIG. 2. In view of the offset light paths 30, 31, the end faces 36, 38 of the chip 12 are formed at angles which are normal to the light paths 30, 31, thereby minimizing any additional refraction of the light at the chip 12 interface. In the preferred embodiment of the invention 10, the fiber 16 is retained in position between the chip 12 and the plate 14, by a pair of guides 40, 42, which are formed as part of the chip 12.

Figure 3:
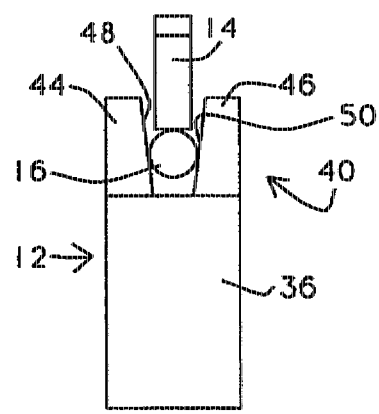
FIG. 3 is a side view of the chip portion and the deflector plate of the present invention illustrating how it is able to retain an optical fiber in position.

With reference to FIG. 3, one of the guides 40 is illustrated to have a pair of fiber retaining members 44, 46 which preferably have sloped interior walls 48, 50. Accordingly, when the plate 14 is pressed against the fiber 16, the fiber 16 is held in position by the fiber retaining members 44, 46 against the chip 12. In view of the fact that no part of the light paths 30, 31 pass through the plate 14, the plate 14 may be made out of any suitably hard material, i.e., a material which is able to microbend the fiber 16, as shown at microbends 52 (FIG. 2) whether or not the material of the plate 14 is transparent.

With reference to FIG. 2, if light is entering the fiber 16 from the left side of the chip 12 (as shown in FIG. 2), there will be light output on the right side of the chip 12 (along the optical path 31), and, similarly, if light is entering the fiber 16 from the right side of the chip 12, there will be light output on the left side of the chip 12 (along the optical path 31). Accordingly, in operation as an identifier, the optical components 12, 14 which comprise the device 10 must also include at least one light detector 32, although a pair of light detectors 32, 34 is shown (as light travels only one way on a fiber, and it is desirable to not have to reposition the device 10 if it fails to detect light when it is first placed on the fiber 16). Also, the use of two light detectors 32, 34, enables the device 10 to detect the direction of traffic on the fiber 16. While the detection of the direction of traffic on the fiber 16 may appear to be a trivial act, unless the location of the microbend portions 22, 28 are sufficiently well defined with respect to the location of the macrobend portions 18, 24 and 20, 26, there will be so much internal reflection, that while it may be possible to determine whether any traffic is present, it may not be possible to determine the direction of that traffic. This may be possible only in devices like the present invention in which the microbend and macrobend portions (of the chip 12 and the plate 14) are made out of a single piece of material (i.e., a one piece chip 12 and a one piece plate 14).

As will be obvious to those skilled in the art, when the device 10 is used as a light coupler, the elements 32, 34 would preferably be light emitters, such as LEDs or laser diodes, which transmit light through the faces 36, 38 onto the macrobends 18, 20. While the elements 32, 34 are shown to be affixed to the faces 36, 38, they may also be displaced from the surfaces 36, 38.

Figure 4:
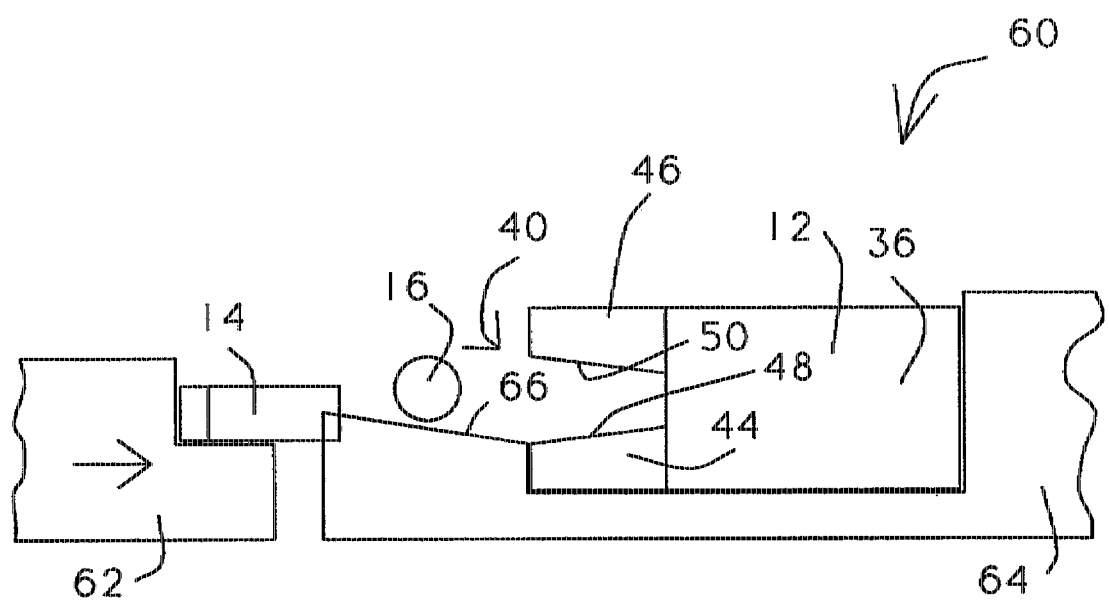
FIG. 4 illustrates a tool containing the present invention as it receives a fiber for testing.
Figure 5:
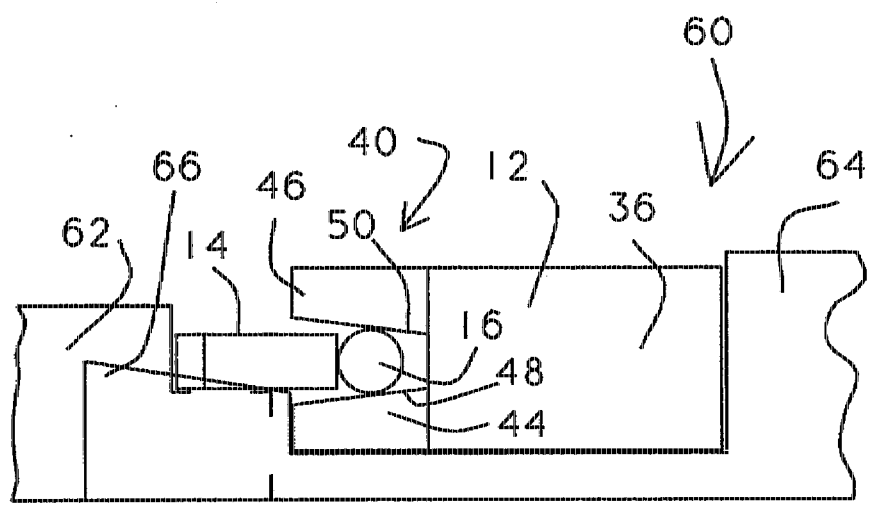
FIG. 5 illustrates the tool of FIG. 4 with the fiber in position for testing.

With reference to FIGS. 4 and 5, in use the chip 12 and the plate 14 are fixed in place within a tool 60, the overall details of which will be readily understood by those skilled in the art to be capable of receiving a strand of fiber 16 and directing it into the appropriate location while the chip 12 and the plate 14 are brought together to press on the fiber 16. Accordingly, the overall design of the tool 60 is not important to the invention, so long as it accomplishes the foregoing purposes.

As illustrated in FIG. 4, when a piece of fiber 16 is placed between the open jaws 62, 64 of the tool 60, it will come to rest on a sloped portion 66 of jaw 64 which will direct the fiber 16 into the opening between the fiber retaining members 44, 46 which are part of the guide 40.

With reference to FIG. 5, when the jaws 62, 64 of the tool 60 are closed on the fiber 16, the fiber 16 will be urged into place, as the sloped portion 66 will direct the fiber 16 into the correct position between the fiber retaining members 44, 46. Accordingly, as additional pressure is applied, the tool 60, which is typically a pliers-like device which may also house the electronics required to detect light emitted by the fiber 16, when the elements 32, 34 are light detectors (or to couple light into the fiber 16 when the elements 32, 34 are light emitters), causes the chip 12 and the plate 14 to impose the microbending and macrobending forces on the fiber 16, as discussed above.

We claim:

1. A device for use in testing single mode optical fiber comprising:
   (a) a chip portion being formed of a single piece of material which will pass light of the wavelength carried by the fiber, said chip portion having a fiber receiving surface which is formed to receive an optical fiber, said fiber receiving surface having both a macrobend portion and a microbend portion formed thereon; and
   (b) a plate portion having a surface which is formed of a single piece of material, said plate portion having a shape which is complementary to said fiber receiving surface of said chip portion.

2. The device of claim 1 in which said fiber receiving surface is formed to have a plurality of macrobend portions.

3. The device of claim 2 in which said fiber receiving surface is formed to have two macrobend portions.

4. The device of claim 3 in which said microbend portion of said fiber receiving surface is formed between said two macrobend portions.

5. The device of claim 4 in which said microbend portion of said fiber receiving surface is formed to have a periodically repeating shape, when viewed from a position orthogonal to said surface.

6. The device of claim 5 in which said periodically repeating shape is a sine wave.

7. The device of claim 6 in which the chip and the plate are formed of a polycarbonate material.

8. The device of claim 7 in which the wavelength of said sine wave is in the range of from approximately 15 mils to approximately 25 mils.

9. The device of claim 8 in which the wavelength of said sine wave is approximately 18 mils.

10. The device of claim 7 in which said macrobend portion of said chip portion is formed as an arc having a radius in the range of about 3 mm to about 6 mm and the complementary macrobend portion of the plate is formed as an arc having a radius which is somewhat less than the radius of the chip portion in order to allow the fiber to be conformably bent therebetween.

11. The device of claim 7 in which said macrobend portion of said chip portion is formed as an arc having a radius of about 4.25 mm and the complementary macrobend portion of the plate is formed as an arc having a radius of about 4 mm.

12. A live fiber identifier for use in testing single mode optical fiber comprising:
   (a) a chip portion being formed of a single piece of material which will pass light of the wavelength carried by the fiber, said chip portion having a fiber receiving surface which is formed to receive an optical fiber, said fiber receiving surface having both a macrobend portion and a microbend portion formed thereon; and (b) a plate portion formed of a single piece of material which has a surface which is formed to be complementary to said fiber receiving surface of said chip portion; and (c) movement means for mechanically urging said chip portion and said plate portion together, whereby said plate portion and said chip portion will simultaneously impose both macrobending and microbending forces upon any optical fiber which has been placed therebetween.

13. The live fiber identifier of claim 12 in which said fiber receiving surface is formed to have a plurality of macrobend portions.

14. The live fiber identifier of claim 13 in which said fiber receiving surface is formed to have two macrobend portions.

15. The live fiber identifier of claim 14 in which said microbend portion of said fiber receiving surface is formed between said two macrobend portions.

16. The live fiber identifier of claim 15 in which said microbend portion of said fiber receiving surface is formed to have a periodically repeating shape, when viewed from a position orthogonal to said surface.

17. The live fiber identifier of claim 16 in which said periodically repeating shape is a sine wave.

18. The live fiber identifier of claim 17 in which the chip and the plate are formed of a polycarbonate material.

19. The live fiber identifier of claim 17 further comprising at least one light detector, said at least one light detector being aligned with the path of light which will be emitted through said chip from a live fiber.

20. The live fiber identifier of claim 16 in which the wavelength of said sine wave is in the range of from approximately 15 mils to approximately 25 mils.

21. The live fiber identifier of claim 16 in which said macrobend portion of said chip portion is formed as an arc having a radius in the range of from about 3 mm to about 6 mm.

22. The live fiber identifier of claim 21 further comprising at least one light detector which is placed in the path which light would take if it was emitted by a piece of optical fiber being tested.

23. The live fiber identifier of claim 22 further comprising urging means for receiving a piece of fiber and for urging it into the appropriate test position as said movement means brings said chip and said plate together.

24. The live fiber identifier of claim 23 wherein said urging means include guides formed on said chip, said guides comprising a pair of spaced members, each of said pair being remote from the central portion of said chip, each of said pair of guides having an opening formed therebetween for receiving a piece of fiber.

25. The live fiber identifier of claim 24 wherein said urging means further comprises a sloped portion on the portion of said mechanical means which retains said chip, whereby when said fiber is received by said sloped portion and said mechanical means are brought together, said fiber will be directed into said opening formed in said guides.

26. The live fiber identifier of claim 25 further comprising electronics which react to light received by light detectors in the light path by indicating the presence of traffic on said fiber.

27. The live fiber identifier of claim 26 containing a light detector on either side of said chip.

28. The live fiber identifier of claim 27, wherein said electronics indicate the direction of said traffic based upon which of said light detectors actually detects light emissions from said fiber.

* * * * *